(12) United States Patent
Kong et al.

(10) Patent No.: US 8,263,271 B2
(45) Date of Patent: Sep. 11, 2012

(54) FUEL CELL SYSTEM

(75) Inventors: Sang-Jun Kong, Suwon-si (KR);
Seong-Kee Yoon, Suwon-si (KR);
Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 591 days.

(21) Appl. No.: 12/146,586

(22) Filed: Jun. 26, 2008

(65) Prior Publication Data
US 2009/0110973 A1    Apr. 30, 2009

(30) Foreign Application Priority Data
Oct. 30, 2007    (KR) ........................ 10-2007-0109801

(51) Int. Cl.
*H01M 8/06* (2006.01)
*C01B 3/02* (2006.01)
*B01J 7/00* (2006.01)

(52) U.S. Cl. ..................... 429/421; 429/416; 423/648.1; 48/61

(58) Field of Classification Search .................... 429/12, 429/19, 400, 408, 416, 421; 423/648.1, 651, 423/657, 658.2; 48/61
See application file for complete search history.

(56) References Cited

U.S. PATENT DOCUMENTS

| | | | | |
|---|---|---|---|---|
| 2,378,539 A * | 6/1945 | Dawihl | ............................ | 264/85 |
| 2,678,504 A * | 5/1954 | Knopp | ............................ | 34/581 |
| 3,759,677 A * | 9/1973 | White | ............................ | 48/209 |
| 4,247,240 A * | 1/1981 | Schora et al. | ................. | 414/218 |
| 5,817,157 A * | 10/1998 | Checketts | ........................ | 48/61 |
| 2003/0162059 A1* | 8/2003 | Gelsey | ............................ | 429/17 |
| 2004/0047801 A1* | 3/2004 | Petillo et al. | .................. | 423/657 |
| 2004/0121196 A1* | 6/2004 | Liu et al. | ........................ | 429/12 |
| 2004/0166057 A1* | 8/2004 | Schell et al. | ............... | 423/658.2 |
| 2006/0188762 A1* | 8/2006 | Gelsey | ............................ | 429/20 |
| 2006/0269470 A1* | 11/2006 | Zhang et al. | ............... | 423/648.1 |

FOREIGN PATENT DOCUMENTS

| | | |
|---|---|---|
| JP | 6-333541 | 12/1994 |
| JP | 2003-137502 | 5/2003 |
| JP | 2003-221202 | 8/2003 |
| JP | 2004-161530 | 6/2004 |
| KR | 10-2005-0006141 | 1/2005 |
| KR | 10-2005-0025486 | 3/2005 |

OTHER PUBLICATIONS

Patent Abstracts of Japan, Publication No. 06-333541; Date of Publication: Dec. 2, 1994; in the name of Takumi Tonai. Patent Abstracts of Japan, Publication No. 2003-221202; Date of Publication: Aug. 5, 2003; in the name of Mitsuya Hosoe, et al.
Korean Patent Abstracts, Publication No. 1020050025486 A; Date of Publication: Mar. 14, 2005; in name of Tae Hee Cho, et al.
KIPO Office action dated Jun. 28, 2010, for priority Korean Patent application 10-2007-0109801.
KIPO Notice of Allowance dated Dec. 30, 2010, for Korean priority Patent application 10-2007-0109801, as well as U.S. reference previously in U.S. Office action dated Apr. 14, 2010.

\* cited by examiner

*Primary Examiner* — Basia Ridley
*Assistant Examiner* — Jacob Buchanan
(74) *Attorney, Agent, or Firm* — Christie, Parker & Hale, LLP

(57) ABSTRACT

A fuel cell system includes a fuel cell stack for generating electricity by a electrochemical reaction of hydrogen and oxygen; a controller for controlling the operation of the system; a hydride storage tank for storing hydride powder as a source of hydrogen for the fuel cell stack; a hydrogen separating chamber for collecting hydrogen gas generated from a reaction of the hydride powder and liquid catalyst; a powder transferring device for transferring the hydride powder to the hydrogen separating chamber; and a residue collector for collecting residues that are generated from the reaction and settled at the bottom of the hydrogen separating chamber.

20 Claims, 5 Drawing Sheets

FUEL CELL SYSTEM

CROSS-REFERENCE TO RELATED APPLICATIONS

This application claims priority to and the benefit of Korean Patent Application No. 10-2007-0109801, filed on Oct. 30, 2007, in the Korean Intellectual Property Office, the entire content of which is incorporated herein by reference.

BACKGROUND

1. Field of the Invention

The present invention relates to a fuel cell system using a hydride powder as a source of hydrogen fuel.

2. Discussion of Related Art

A fuel cell is a power generation system that generates electricity by an electrochemical reaction of hydrogen and oxygen. There are several types of fuel cells, each using a different chemistry or electrolyte. Examples of different fuel cells include phosphoric acid fuel cells, molten carbonate fuel cells, solid oxide fuel cells, polymer electrolyte membrane fuel cells, and alkaline fuel cells, etc. These fuel cells operate on the same general principles, but use different types of fuel, catalysts, electrolytes, and operate at different temperatures, etc. Among the different fuel cells, polymer electrolyte membrane fuel cells (PEMFC) have a high output characteristic and operate at a low operating temperature range. In addition, a PEMFC has rapid starting and response characteristics as compared with other fuel cells. Therefore, PEMFCs can be used in a variety of applications such as transportable power sources for portable electronic equipment, power sources for automobiles, and distributed power sources for stationary power plants for houses and public buildings.

Hydrogen undergoes an electrochemical oxidation reaction at the anode electrode of a fuel cell and has excellent reactivity reacting with oxygen to produce water at the cathode electrode. Such a fuel cell provides an environmental-friendly discharge; hence hydrogen is one of the most suitable fuels for fuel cells. However, pure hydrogen gas is not readily available and hydrogen gas is frequently obtained by reforming hydrogen-rich raw materials.

Fuel cell systems using hydrides which can be stored in a powder form such as $NaBH_4$, etc. have been proposed as a fuel. Such fuel cell systems have high volume storage efficiency. Hydrides can be supplied to a fuel cell in a liquid form or can be used to generate hydrogen in a gaseous form that is supplied to the fuel cell. In the gaseous form, hydrogen gas is first separated from the hydrides through a chemical reaction, and then it is fed to an anode electrode of a PEMFC stack.

Hydrides are compounds that produces hydrogen and heat upon reacting with water. Several examples of hydrides that can be used as a fuel for fuel cells include, but are not limited to, sodium borohydride ($NaBH_4$), lithium borohydride ($LiBH_4$), lithium hydride (LiH), sodium hydride (NaH), and combinations thereof.

There are several ways for supplying hydrides to produce hydrogen to be used as a fuel. When liquid hydrides are used, the size of the fuel cell system increases due to the volume of water. When hydride powder is used, a complex system of delivering and controlling the amount of powder is required. In addition, the reaction time of the hydride powder must be considered in operating the fuel cell.

SUMMARY OF THE INVENTION

An embodiment of the present invention is directed toward a fuel cell system that includes a hydride storage tank adapted to store hydride powder, a hydrogen separating chamber adapted to contain hydrogen gas generated by a reaction of the hydride powder and a liquid catalyst, a powder transferring device adapted to transfer and discharge the hydride powder to the hydrogen separating chamber, a residue collector adapted to collect residues generated from the reaction, a fuel cell stack adapted to convert the hydrogen gas to power, and a controller adapted to control the transfer of hydride powder from the hydride storage tank to the hydrogen separating chamber.

In one embodiment, the powder transferring device includes a transfer screw adapted to transfer and discharge the hydride powder, a motor adapted to rotate the transfer screw, and a motor driving unit adapted to supply power to the motor according to a control signal received from the controller.

In another embodiment, the powder transferring device further includes a block gate adapted to segregate the liquid catalyst fluid from reaching the powder transferring device.

In yet another embodiment, the powder transferring device includes a conveyor adapted to receive and transfer the hydride powder from the hydride storage tank to the hydrogen separating chamber, a motor adapted to operate the conveyor, and a motor driving unit adapted to supply power to the motor according to a control signal received from the controller.

In one embodiment, an air blower is provided to assist in expelling the hydride powder from the conveyor.

In one embodiment, the hydrogen separating chamber includes a storage chamber adapted to store the liquid catalyst, a residue collecting pipe at a lower region of the storage chamber, a hydrogen supply pipe at an upper region of the storage chamber, and a hydride powder entrance port at the upper region of the storage chamber.

In another embodiment, the hydrogen separating chamber further includes a gas-liquid separator at an inlet of the hydrogen supply pipe.

According to another embodiment, the hydrogen separating chamber includes an external chamber and an internal chamber inside the external chamber. The internal chamber has a plurality of fluid passing holes and a hydride powder entry port adapted to open to allow the hydride powder from the powder transferring device to pass into the internal chamber, a hydrogen supply pipe, and a gas-liquid separator at an inlet of the hydrogen supply pipe.

In one embodiment, each of the plurality of fluid passing holes in the wall of the internal chamber is adapted to open when it is in contact with the liquid catalyst and close when it is not in contact with the liquid catalyst. In one exemplary embodiment, the hydride powder entry port is closed when the port is in contact with the liquid catalyst.

In one embodiment, the hydride powder entry port and the hydrogen supply pipe are located in the upper region of the internal chamber. In another embodiment, the hydrogen separating chamber further includes a plurality of hydrogen supply pipes.

According to another embodiment, the hydride storage tank is of a hopper configuration, and includes a lower nozzle portion having a cross sectional area that is generally smaller than a cross sectional area of an upper region of the hydride storage tank. The powder transferring device is generally positioned below the nozzle portion.

According to another embodiment of the present invention, the residue collector includes a residue collecting tank adapted to store the residues, and a residue collecting pump adapted to transfer the residues from the hydrogen separating chamber to the residue collecting tank.

According to embodiments of the present invention, the hydride powder may be selected from $NaBH_4$, $LiBH_4$, LiH, NaH, and combinations thereof, and the liquid catalyst may comprise an aqueous acid solution where the acid is selected from the group consisting of malic acid, succinic acid, oxalic acid, citric acid, acetic acid, hydrochloric acid, and combinations thereof.

BRIEF DESCRIPTION OF THE DRAWINGS

The invention will become apparent and more readily appreciated from the following description of certain exemplary embodiments, taken in conjunction with the accompanying drawings.

DETAILED DESCRIPTION

Figure 1A:
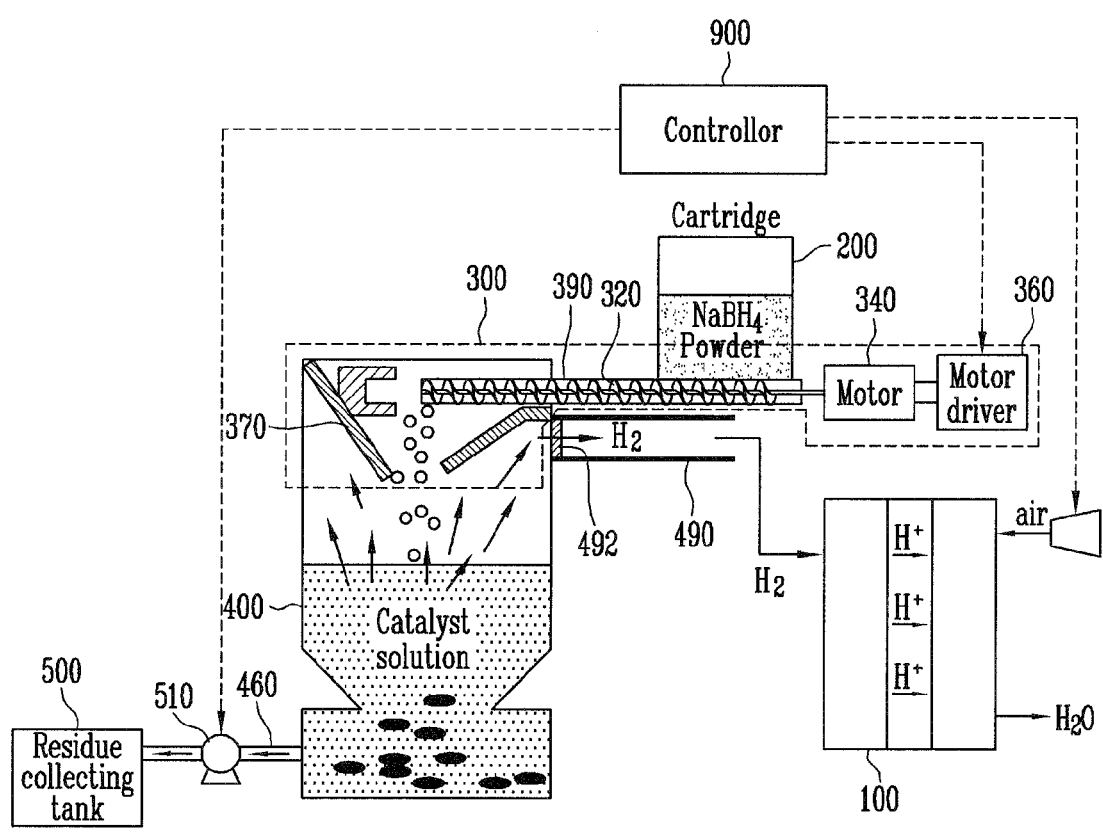
FIGS. 1A and 1B are schematic views of a fuel cell system using $NaBH_4$ powder as a fuel according to one embodiment of the present invention.

Hereinafter, certain exemplary embodiments according to the present invention will be described with reference to the accompanying drawings. Here, elements that are not essential to the complete understanding of the invention are omitted for clarity. Also, like reference numbers refer to like elements throughout.

For example, the following description of the present invention will be made with a fuel cell system using a hydride such as sodium borohydride ($NaBH_4$). However, it is to be understood that other hydrides such as lithium borohydride ($LiBH_4$), lithium hydride (LiH), or sodium hydride (NaH) can also be used as a fuel, and such embodiments are within the scope of the present invention.

In the description of the present invention, the phrase "fuel cell stack" refers to a typical fuel cell stack that includes one or more unit cells arranged in a stacked configuration. Such a fuel cell stack is shown schematically in the drawing figures here as fuel cell stack configured with a single unit cell, but such a schematic representation is intended to represent any fuel cell stack configuration.

Figure 1B:
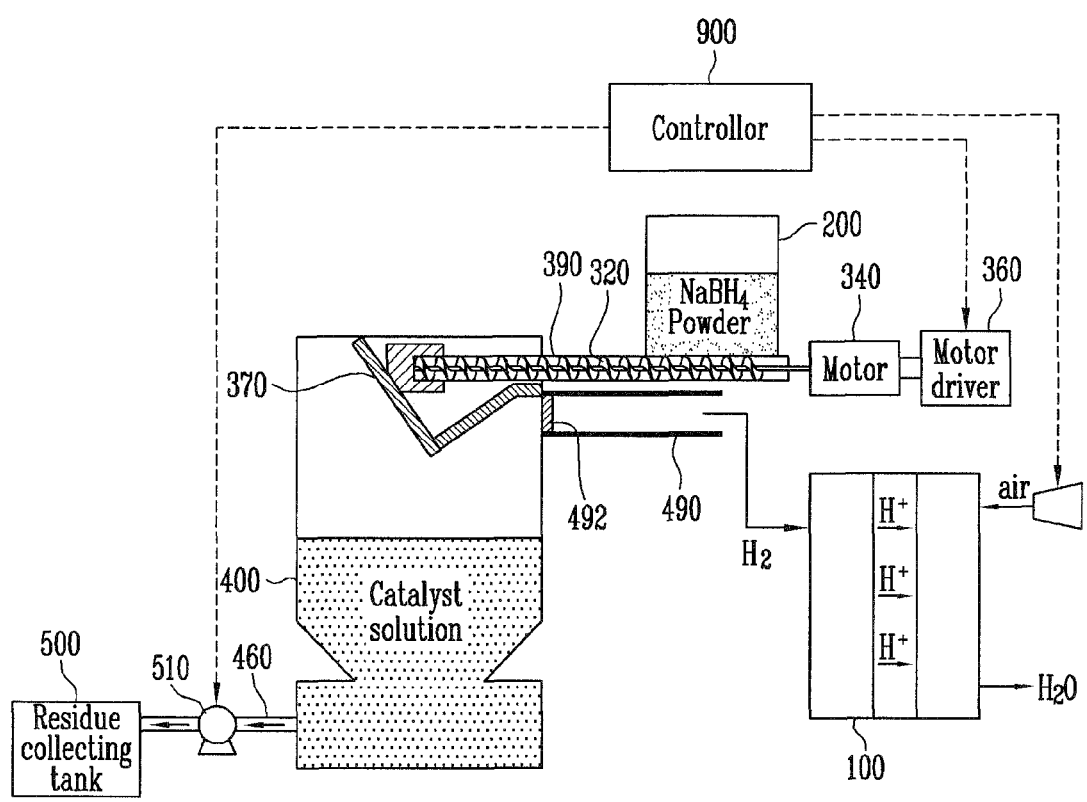

A fuel cell system as shown in FIGS. 1A and 1B includes a fuel cell stack 100, a hydride storage tank 200 for storing a hydride powder such as $NaBH_4$ powder, a hydrogen separating chamber 400 for separating hydrogen generated by a reaction of the hydride powder with a liquid catalyst, a powder transferring device 300 for transferring the hydride powder from the hydride storage tank to the hydrogen separating chamber 400, and a residue collecting tank 500 for collecting residues generated by the reaction and accumulated in the hydrogen separating chamber 400.

The powder transferring device 300 includes a transfer screw 320 for conveying the hydride powder from the hydride storage tank 200, a motor 340 for rotating the transfer screw 320, and a motor driver 360 for supplying power to the motor 340.

The transfer screw 320 comprises a cylindrical shaft wrapped with one or more helical blades. When the transfer screw 320 rotates, the helical blades move the hydride powder toward a discharge end of the screw.

In an exemplary embodiment, a guide pipe 390 is provided to enclose the transfer screw 320 to assist in moving the hydride powder forward. In another embodiment, a block gate 370 is provided within the hydrogen separating chamber 400 to both block the transfer screw 320 and to provide a partition from the lower part of the hydrogen separating chamber. The block gate 370 is positioned at the discharge end of the transfer screw 320 through which the hydride powder is discharged. In a closed position, as shown in FIG. 1B, the block gate 370 caps off the transfer screw 320 when the hydride powder is not needed. Also in this position, the block gate 370 prevents the liquid catalyst from reaching the transfer screw 320 in an upset condition.

The hydride powder stored in the hydride storage tank 200 is fed to the transfer screw 320 by gravity. As a batch of the hydride powder at the bottom of the tank 200 drops to the transfer screw 320, another batch of the hydride powder drops down by gravity to replace it.

The motor driver 360 supplies power to the motor 340 in accordance with a control system scheme regulated by a controller 900.

The motor 340 is driven by the motor driver 360 and suitable motors include DC motors or stepping motors, for example.

The hydrogen separating chamber 400 is a tank adapted to store fluids that may exist in either or both of liquid and gas phases. At the lower portion of the chamber 400 a residue removing pipe 460 is provided for discharging residues produced by the chemical reaction of the hydride. At the upper portion of the chamber 400 a hydrogen supply pipe 490 is provided to transfer hydrogen from the hydrogen separating chamber 400 to the fuel cell stack 100. A gas-liquid separator 492 is also provided at the inlet of the hydrogen supply pipe 490 to prevent liquid from the chamber from entering the hydrogen supply pipe 490.

Hereinafter, processes of producing and collecting hydrogen from the hydride powder, and for removing residues produced by the reaction will be described.

If it is determined that the amount of hydrogen in the stack needs to be increased, the controller 900 of the fuel cell system generates an appropriate control signal to the motor driver 360. The motor driver 360 then supplies power to the motor 340 for a certain interval of time. In other words, the interval of time may be based on the control signal that is generated by the controller 900. Each control signal may include a driving start signal and a driving end signal that controls the operation of the motor driver 360.

When the motor 340 is a stepping motor, the control signal can be a set of pulses. In this exemplary embodiment, the controller 900 can generate driving pulse signals directly to the motor 340. Accordingly, the motor driver 360 only operates as a buffer circuit for transferring the driving pulse signals from the controller 900 to the motor 340 and in certain embodiments may be omitted.

The motor 340 rotates the transfer screw 320. As the transfer screw 320 rotates it pushes the hydride powder along its longitudinal axis, discharging the hydride powder into the hydrogen separating chamber 400.

The hydride powder is then scattered into the liquid catalyst stored below in the hydrogen separating chamber 400. The liquid catalyst and the hydride powder react to generate hydrogen gas and byproducts such as salt. In general, the liquid catalyst is an aqueous acid solution. Where $NaBH_4$ is the hydride, hydrogen gas and $NaBO_2$ salt are produced in accordance with chemical formula 1 below:

$$NaBH_4 + 2H_2O \rightarrow NaBO_2 + 4H_2 + Q, \qquad \text{[Chemical formula 1]}$$

where Q is heat. Suitable liquid catalysts include aqueous solutions of malic acid, succinic acid, oxalic acid, citric acid, acetic acid, hydrochloric acid, and mixtures thereof.

The hydrogen gas that is generated rises into the space above the liquid level of the liquid catalyst in the hydrogen separating chamber 400. There, it can be stored, or alternatively, the hydrogen gas can be routed away from the hydrogen separating chamber 400 via a hydrogen supply pipe 490 and stored in a separate hydrogen storage tank. In one embodiment, the hydrogen gas is supplied directly to the anode of the fuel cell stack 100 through the hydrogen supply pipe 490.

The salt generated from the reaction, for example, $NaBO_2$, is insoluble and forms a residue which settles to the bottom of the hydrogen separating chamber 400 due to its higher specific gravity than the liquid catalyst. Accordingly, there are three phases that exist in equilibrium within the hydrogen separating chamber 400, a solid residue phase which is generally suspended in a portion of the liquid catalyst at the bottom layer of the hydrogen separating chamber 400, a liquid catalyst phase, and a hydrogen gas phase that blankets the liquid catalyst phase.

In one exemplary embodiment, a residue removing pipe 460 is provided to remove the residues from the bottom of the hydrogen separating chamber 400. The residue removing pipe 460 may be connected to a pump 510 and/or a valve for controlling the flow of the residues. In other exemplary embodiments, the residues at the bottom of the hydrogen separating chamber 400 are discharged from the hydrogen separating chamber 400 through the residue removing pipe 460 by pressure exerted from a blanket of hydrogen gas and/or by gravity from the weight of the liquid. The discharged residues are collected and may be stored in a residue collecting tank 500.

The generated hydrogen gas is then supplied to the anode of the fuel cell stack while oxygen is supplied to the cathode of the fuel cell stack 100 to generate electricity by means of the electrochemical reaction. The generated electricity may be routed directly to a power consuming device, or to a power conversion device such as to charge a secondary battery.

Figure 2:
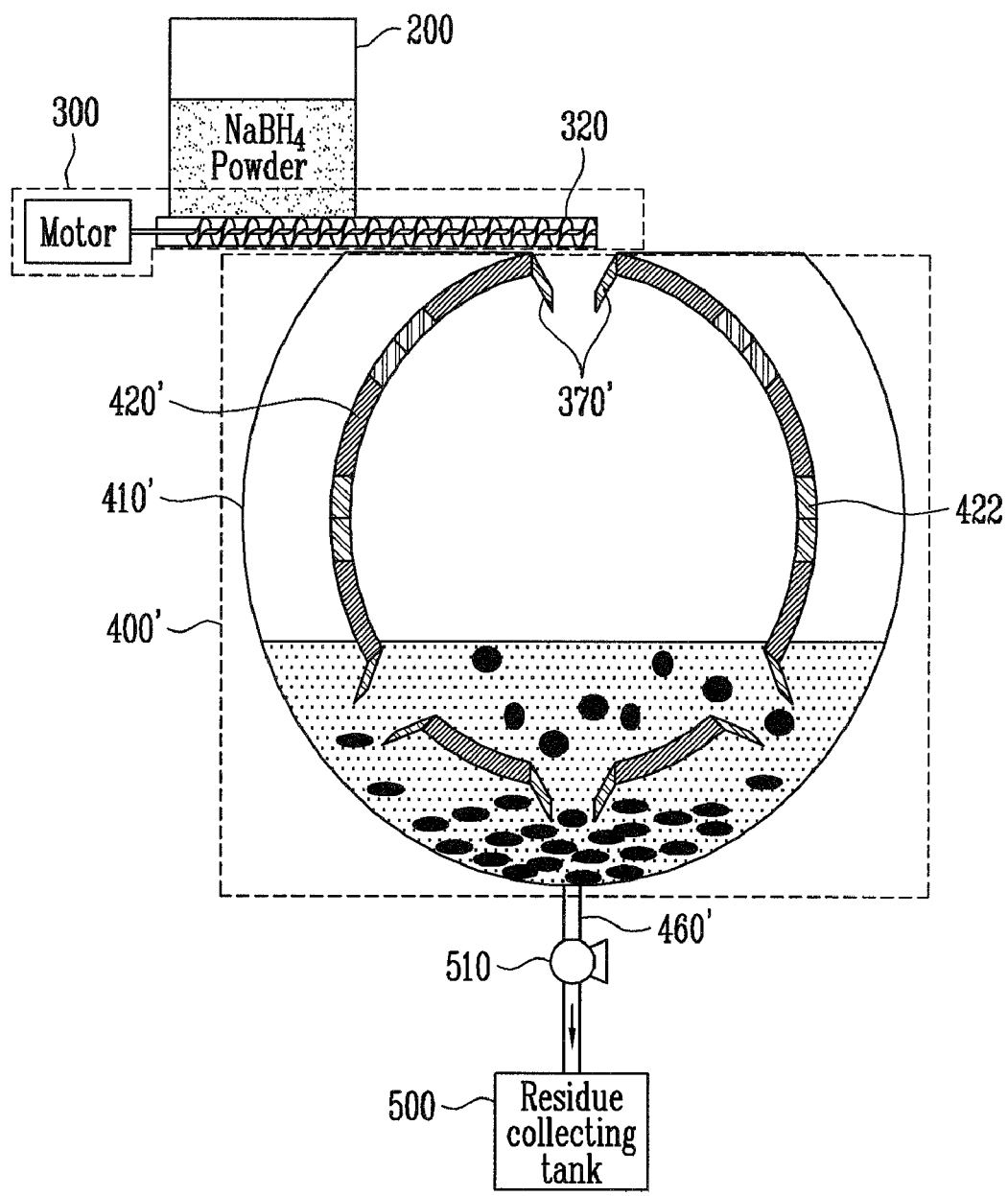
FIG. 2 is a schematic view of a fuel cell system using $NaBH_4$ powder as a fuel according to another embodiment of the present invention.

A fuel cell system according to the embodiment of FIG. 2 includes a fuel cell stack (not shown), a hydride storage tank 200, a hydrogen separating chamber 400', a powder transferring device 300, and a residue collecting tank 500. In an exemplary embodiment, the hydrogen separating chamber 400' has a double chamber structure in which hydrogen gas is generated from a reaction of a hydride powder such as $NaBH_4$ powder with a liquid catalyst.

The powder transferring device 300 transfers hydride powder from the hydride storage tank 200 to the hydrogen separating chamber 400' by means of a rotating transfer screw 320. The residue collecting tank 500 is provided to collect residues accumulated at the bottom of the hydrogen separating chamber 400'.

In this embodiment, the hydride storage tank 200, the powder transferring device 300, the residue collecting tank 500, and the fuel cell stack are similar to those as described in the previous embodiments.

A block gate 370' is also provided to cover a powder inlet of the hydrogen separating chamber 400'. The block gate 370' is positioned at a discharge end of the transfer screw 320 through which the hydride powder is discharged.

The fuel cell system according to this embodiment of the present embodiment does not depend on its orientation. In other words, the fuel cell system can be oriented in different positions and should operate successfully regardless of its orientation. For example, when the fuel cell system is tilted or oriented on the side opposite from the residue collecting tank 500, the block gate 370' is closed to prevent the liquid catalyst from entering the powder transferring device 300. The block gate 370' only opens when a sensor detects no presence of the liquid catalyst at the block gate 370' or at the powder inlet of the hydrogen separating chamber 400'. Accordingly, when it is determined by the controlling unit of the fuel cell system that a new supply of hydride powder is needed, the sensor first detects if there is a presence of the liquid catalyst at the powder inlet of the hydrogen separating chamber 400' or block gate 370'. If there is no presence of the liquid catalyst, the controlling unit activates the powder transferring device 300 and the block gate 370'. Only at that point, the block gate 370' would open to allow the hydride powder to be discharged to the hydrogen separating chamber 400'.

The hydrogen separating chamber 400' according to this embodiment of the present invention has two chambers, an internal chamber 420' and an external chamber 410', to allow the fuel cell system to operate in an regardless of its orientation. The internal chamber 420' contains mostly residue-free liquid catalyst and the external chamber 410' contains the residues that are formed by the hydrogen-generating reaction.

The internal chamber 420' has a plurality of fluid-passing holes 422 to allow the liquid catalyst to move between the internal chamber 420' and the external chamber 410'. In one embodiment, each fluid-passing hole 422 comprises a valve that opens when it is submerged in a liquid. In one exemplary embodiment, the valve is automatically opened as a result of changes in buoyancy and/or in gravity when it is submerged in the liquid. In one exemplary embodiment, the valve is closed by elastic force.

In another exemplary embodiment, the opening and closing of the valves is controlled by a logic circuit which may be controlled by the controller. Similar to the previously described embodiment, the logic circuit employs a suitable sensor to detect if there is a presence of the liquid at each fluid-passing hole 422, and the valve is opened or closed accordingly. According to yet another embodiment, a suitable sensor is used to detect the orientation of the fuel cell system. For example, when a fuel cell system is oriented in an upright direction as shown in FIG. 2, only the bottom three valves and the top valve are opened with the remaining valves closed.

While this embodiment illustrates use of a single residue removing pipe 460', in other embodiments, a plurality of residue removing pipes may be connected to the external chamber 410' for withdrawing residues.

In an upright position, the discharge end of the transfer screw 320 is situated directly above the block gate 370' and above the liquid level of the liquid catalyst. Also in the upright position, a hydrogen supply pipe (not shown) for transferring hydrogen gas to the anode of the fuel cell stack is situated above the liquid level and in the vicinity of the block gate 370' in the internal chamber.

While the invention has been described as including a single hydrogen supply pipe, in other embodiments, a plurality of hydrogen supply pipes may be provided. For example, in one embodiment, there are at least two hydrogen supply pipes forming at two locations of the inner wall that face opposite one another.

The process of forming hydrogen gas and removing residues according to an embodiment of the present embodiment will now be described.

First, hydride powder from the powder transferring device 300 is discharged or scattered into the liquid catalyst at the bottom of the internal chamber 420'. The liquid catalyst and the hydride powder react to generate hydrogen gas and a salt residue. For example, where $NaBH_4$ is used as the hydride, hydrogen is generated in accordance with chemical formula 1 as shown above. The hydrogen gas that is generated may be temporarily collected in the vacant space of the internal chamber 420' or in a separate hydrogen storage tank, and from there is routed to the anode of the fuel cell stack through the hydrogen supply pipe.

The salt generated by the reaction (for example, $NaBO_2$) settles as a residue. As the residue particles have a higher specific gravity than the liquid catalyst, they settle and accumulate at the bottom of the hydrogen separating chamber 400'. Because the liquid in the internal chamber and the external chamber is able to move through the opened fluid-passing holes 422, the residues settle and accumulate outside of the internal chamber 420'. To the extent there are any residues with a lower specific gravity, such residues tend to remain inside the internal chamber 420'.

Since most of the residues are accumulated outside of the internal chamber 420' and are located directly above an inlet of the residue removing pipe 460' they can be removed from the chamber at a relatively high rate. Even when the fuel cell is oriented in other directions that are different than the one shown in FIG. 2, the rate of removing the residues remains high since most of the residues are located outside of the internal chamber 420' and are closer to the inlet of the residue removing pipe 460'. In one embodiment, the discharged residues are stored in the residue collecting tank 500.

Figure 3:
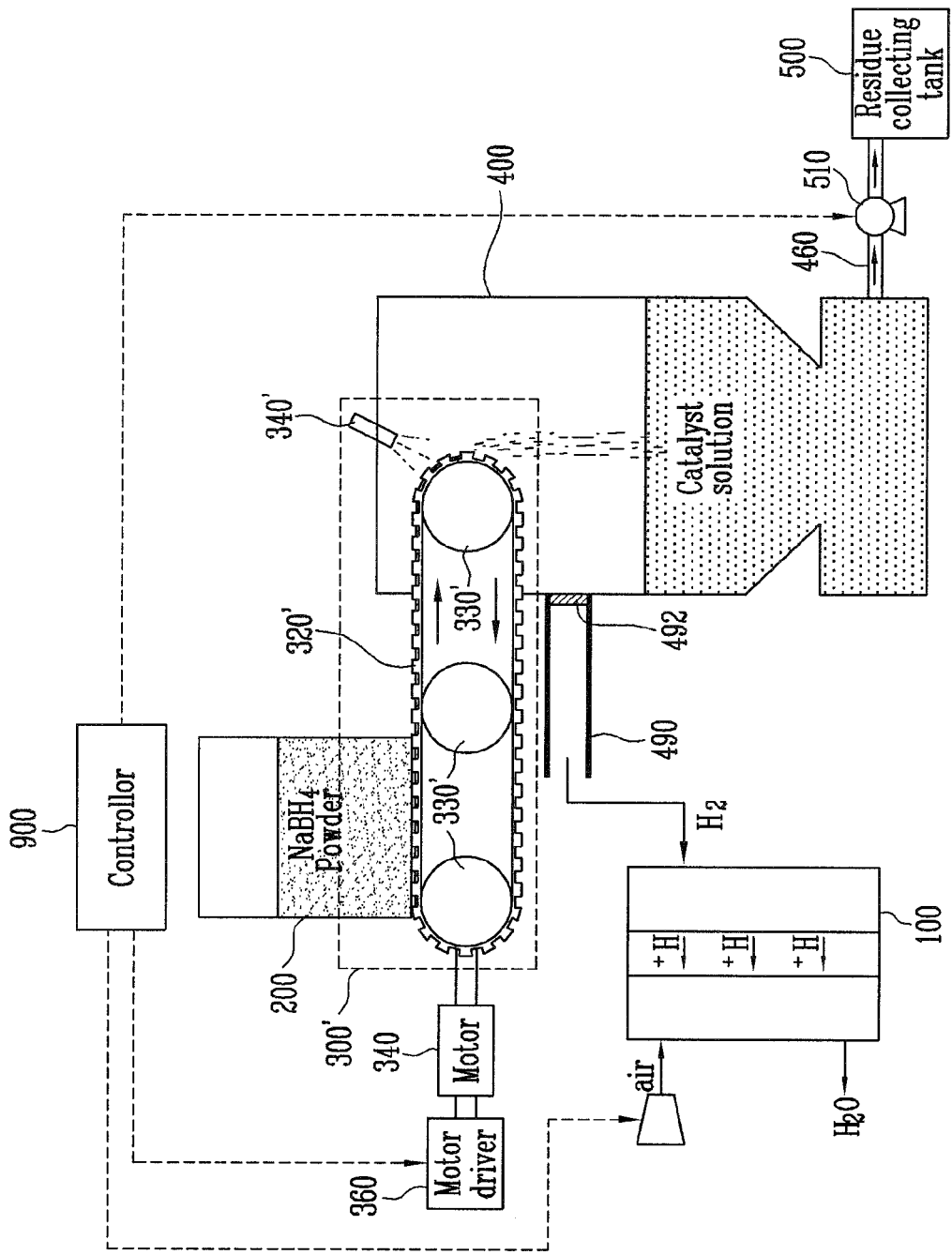
FIG. 3 is a schematic view of a fuel cell system using $NaBH_4$ powder as a fuel according to still another embodiment of the present invention.

A fuel cell system shown in FIG. 3 includes a fuel cell stack 100, a hydride storage tank 200, a hydrogen separating chamber 400, a hydride powder transferring device 300', and a residue collecting tank 500.

Similar to the embodiments described above, the hydride storage tank 200 is used for storing $NaBH_4$ powder. The hydrogen separating chamber 400 is for separating hydrogen gas generated by the reaction of the hydride powder with a liquid catalyst. The powder transferring device 300' is used to transfer hydride powder to the hydrogen separating chamber 400 by means a conveyor 320', and the residue collecting tank 500 is used to store residues that are generated from the reaction.

In an exemplary embodiment, the powder transferring device 300' includes a conveyor 320' that is located directly at the bottom of the hydride storage tank 200. According to an embodiment, the conveyor 320' is a belt moved by a set of rollers 330'. A motor 340 rotates the rollers 330' and a motor driver 360 supplies power to the motor 340.

In one exemplary embodiment, the conveyor 320' has grooves adapted to receive hydride powder in discreet amounts. In one exemplary embodiment, a blower 340' is provided at a discharge end of the powder transferring device 300' to encourage the discharge of hydride powder to the hydrogen separating chamber 400. In one embodiment, the blower 340' directs an air stream at an angle above the conveyor so that the hydride powder filled in the grooves can be expelled from the grooves and scattered into the liquid catalyst stored below.

Hereinafter, the process of transferring the hydride powder from the powder transferring device 300' will be described.

If it is determined that the amount of hydrogen in the stack needs to be increased, the controller 900 of the fuel cell system generates an appropriate control signal to the motor driver 360. The motor driver 360 then supplies power to the motor 340 as described in previous embodiments.

The motor 340 rotates the rollers 330' which move conveyor 320' in a circulating direction as shown by the arrows in FIG. 3. The hydride powder carried by the conveyor 320' is discharged into the liquid catalyst as the conveyor 320' turns downwardly at the last roller 330'. At about the same location, the blower 340' directs an air stream to the conveyor grooves to encourage the discharge and scattering of the powder into the liquid catalyst. In one embodiment, the blower is controlled to operate only when the conveyor 320' is in operation.

Figure 4:
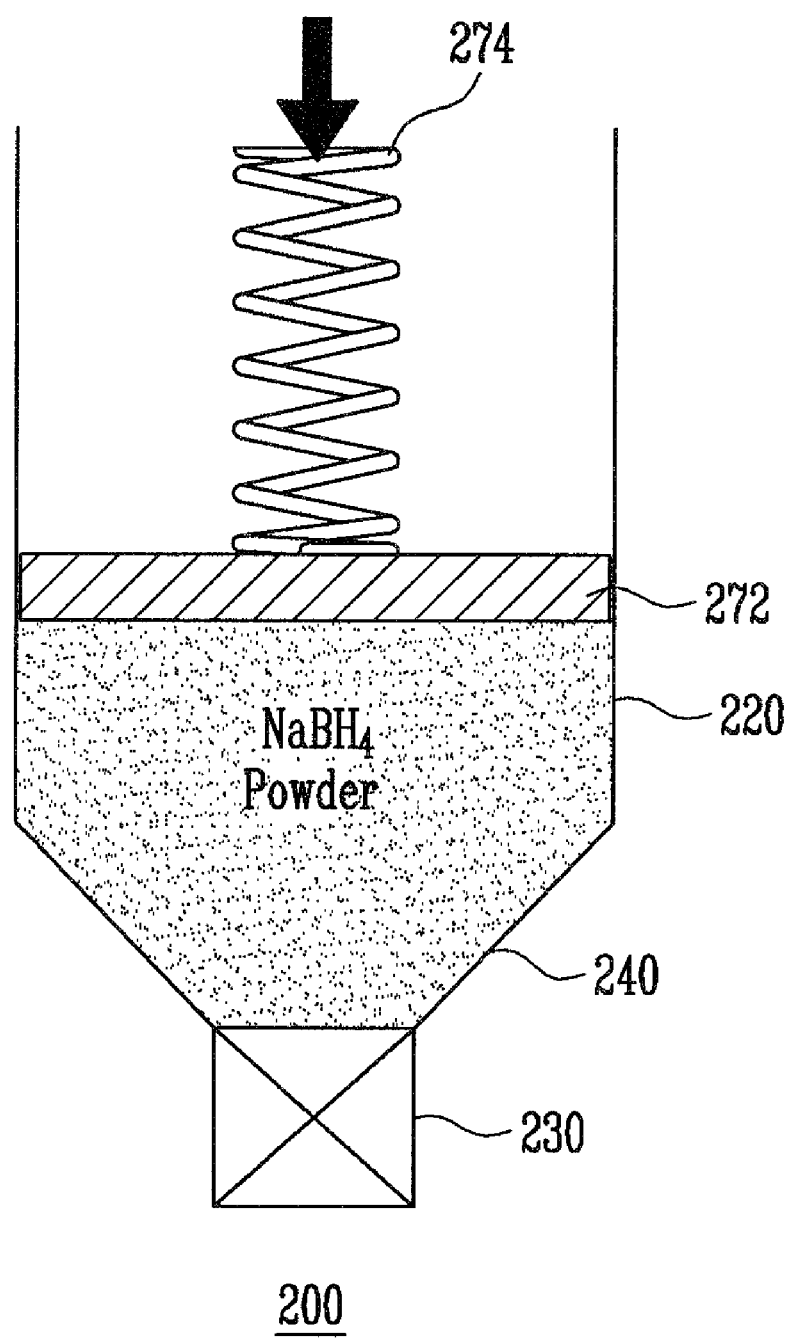
FIG. 4 is a cross-sectional view of a $NaBH_4$ storage tank according to one embodiment of the present invention

FIG. 4 shows an exemplary embodiment of a $NaBH_4$ powder storage tank of a hopper configuration that can be used with the fuel cell systems of the previously described embodiments.

In an exemplary embodiment, the $NaBH_4$ storage tank 200 has generally vertical side walls 220 that taper inwardly at the lower side walls 240 and form a nozzle region 230 at the bottom such that the storage tank is of a funnel-shaped configuration.

The transfer screw 320 or the conveyor 320' of the previous embodiments may be placed at the nozzle region 230 at the lower side walls 240. In one embodiment, the nozzle region 230 has a long and narrow rectangular shape.

In one exemplary embodiment, a press plate 272 is provided to sweep the inner side walls 220 of the storage tank 200, and encourage the transfer of hydride powder into to the nozzle region 230 for transfer by the transfer screw. In one embodiment, a press spring 274 biases the press plate 272.

The fuel cell systems of the present invention provide improved transfer of hydride powders and can help prevent adverse effects such as clogging of the process pathways. In addition, the fuel cell systems of the present invention maintain an adequate reaction area for the hydride powder and the liquid catalyst.

Although exemplary embodiments of the present invention have been shown and described, it would be appreciated by those skilled in the art that changes might be made in these embodiments without departing from the principles and spirit of the invention, the scope of which is also defined by the claims and their equivalents.

What is claimed is:

1. A fuel cell system comprising:
    a hydride storage tank adapted to store hydride powder;
    a hydrogen separating chamber adapted to contain hydrogen gas generated by a reaction of the hydride powder and a liquid catalyst, wherein the hydrogen separating chamber comprises:
    an external chamber;
    an internal chamber inside the external chamber, wherein the internal chamber includes a plurality of liquid passing holes and a hydride powder entry port adapted to allow the hydride powder from a powder transferring device to pass into the internal chamber; and
    a hydrogen supply pipe;
    the powder transferring device adapted to transfer and discharge the hydride powder to the hydrogen separating chamber;
    a solid residue collector adapted to collect solid residues generated by the reaction;
    a fuel cell stack adapted to convert the hydrogen gas to power; and
    a controller adapted to control the transfer of hydride powder from the hydride storage tank to the hydrogen separating chamber.

2. The fuel cell system of claim 1, wherein the powder transferring device comprises:
    a transfer screw adapted to transfer and discharge the hydride powder; and
    a motor adapted to rotate the transfer screw and operated by the controller.

3. The fuel cell system of claim 2, wherein the powder transferring device further comprises a motor driving unit adapted to supply power to the motor according to a control signal generated by the controller.

4. The fuel cell system of claim 2, wherein the powder transferring device further comprises a block gate adapted to segregate the liquid catalyst from the powder transferring device.

5. The fuel cell system of claim 1, wherein the powder transferring device comprises:
   a conveyor; and
   a motor adapted to operate the conveyor and operated by the controller.

6. The fuel cell system of claim 5, wherein the powder transferring device further comprises a motor driving unit adapted to supply power to the motor according to a control signal received from the controller.

7. The fuel cell system of claim 6, wherein the powder transferring device further comprising a blower adapted to expel the hydride powder from the conveyor.

8. The fuel cell system of claim 1, wherein the hydrogen separating chamber further comprises:
   a residue collecting pipe.

9. The fuel cell system of claim 8, wherein the hydrogen separating chamber further comprises a gas-liquid separator at an inlet of the hydrogen supply pipe.

10. The fuel cell system of claim 1, wherein the hydrogen separating chamber further comprises a gas-liquid separator at an inlet of the hydrogen supply pipe.

11. The fuel cell system of claim 1, wherein each of the plurality of liquid passing holes is adapted to open when it is in contact with the liquid catalyst, and close when it is not in contact with the liquid catalyst.

12. The fuel cell system of claim 1, wherein the hydride powder entry port is adapted to close when the port is in contact with the liquid catalyst.

13. The fuel cell system of claim 1, wherein the hydride powder entry port and the hydrogen supply pipe are located in an upper region of the external chamber.

14. The fuel cell system of claim 1, wherein the hydrogen separating chamber further comprises a plurality of hydrogen supply pipes.

15. The fuel cell system of claim 1, wherein the hydride storage tank is of a hopper configuration comprising a lower nozzle portion adapted to discharge the hydride powder to the powder transferring device.

16. The fuel cell system of claim 15, wherein the powder transferring device is below the nozzle portion.

17. The fuel cell system of claim 15, wherein the hydride storage tank further comprises:
   a press plate adapted to press the hydride powder toward the lower nozzle portion; and
   a spring biasing the press plate.

18. The fuel cell system of claim 1 wherein the solid residue collector comprises:
   a solid residue collecting tank adapted to store the solid residues; and
   a solid residue collecting pump adapted to transfer the solid residues from the hydrogen separating chamber to the solid residue collecting tank.

19. The fuel cell system of claim 1, wherein the hydride powder is selected from $NaBH_4$, $LiBH_4$, $LiH$, $NaH$, and combinations thereof.

20. The fuel cell system of claim 1, wherein the liquid catalyst comprises an aqueous acid solution wherein the acid is selected from the group consisting of malic acid, succinic acid, oxalic acid, citric acid, acetic acid, hydrochloric acid, and combinations thereof.

* * * * *